Patented Sept. 5, 1944

2,357,526

UNITED STATES PATENT OFFICE 2,357,526

FINISHING TEXTILES WITH ALKYD RESIN EMULSIONS

Donald W. Light and Alden D. Nute, Stamford, Conn., assignors to American Cyanamid Company, New York, N. Y., a corporation of Maine No Drawing. Application October 3, 1940, Serial No. 359,548

2 Claims. (Cl. 117—161)

This invention relates to the finishing of textile fabrics including white, printed, discharge printed and plain dyed goods. A principal object of the invention resides in the provision of a resin finish that will give a full, crisp hand to the fabrics similar to a starch finish, but with improved ease of handling. A further object is the provision of a stable resin emulsion having the above properties when applied to textile fabrics.

It has previously been proposed to apply solutions of synthetic resins in organic solvents to textile fabrics as a crease-proofing and water-proofing agent, and aqueous solutions of urea-formaldehyde resins have also been used for this purpose. Efforts have also been made to apply phthalic glyceride resins to textiles by first preparing an alkyd resin of high acid number and neutralizing the acidity with alkali, whereby a water-soluble resin is obtained. Such alkyd resin solutions are suitable for waterproofing, but are not acceptable as a finish for piece goods as they impart a soft and greasy feel to the fabric.

We have now discovered a class of modified alkyd resins which can be converted into thick, stable emulsions of the oil-in-water type and which give a full, crisp hand to textile fabrics such as cotton, cellulose acetate, spun rayon and the like when applied thereto in the manner hereinafter described. The resins which we have found to possess this property are phthalic anhydride-polyhydric alcohol resins which contain benzoic acid or alkyl substituted benzoic acids as modifying agents.

Phthalic glyceride resins are well-known, but as a class they are not well suited as finishing agents for textiles. In fact, the great majority of these resins, both unmodified and oil- or oil-acid modified, are not acceptable as textile finishing agents as the finish which they impart to the goods is undesirable, and practically none of them gives a suitable finish when applied as emulsions. Surprising as it may seem, the physical condition of the resin is not a reliable indication from which to predict its textile finishing properties, for a resin may be quite hard in character and yet give only a soft and undesirable hand to the fabric.

We have found that phthalic anhydride-polyhydric alcohol resins such as phthalic glyceride and phthalic ethylene glycol resins modified with benzoic acid or alkyl-substituted benzoic acids constitutes an exception to the rule stated above, since this specific class is well suited for textile finishing. When emulsified with suitable emulsifying agents such as the class hereinafter described these resins are capable of forming thick, creamy emulsions that are stable for considerable periods of time and capable of dilution with water to any desired degree. Upon application to textiles such as piece goods they give a highly desirable finish of the type similar to starch finishes, but with no masking or clouding of the color of the fabric as with starch.

The benzoic acid and alkyl-substituted benzoic acid modified resin emulsions of our invention are preferably prepared by a method involving a phase reversal. In forming the emulsion the resin is first melted and heated to about 90–95° C., after which an aqueous solution of an alkali-solubilized protein is added in a thin stream with vigorous agitation. A thin, clear dispersion of the aqueous solution in the resin is first formed, but upon continued addition of the emulsifying agent and continued agitation there occurs an inversion to an oil-in-water emulsion in which the disperse phase is a phthalic anhydride-polyhydric alcohol resin modified by the incorporation therein of benzoic acid or an alkyl-substituted benzoic acid and the continuous phase is the alkali-solubilized protein solution. This emulsion is quite stable and can be stored and shipped at a high solids content.

Although any phthalic anhydride-polyhydric alcohol resin modified with benzoic or alkyl-substituted benzoic acid may be used in practicing our invention, we have found that emulsions of improved stability and better textile finishing properties are obtained when a resin of relatively low acid number is used. The normal acid number of a benzoic acid modified alkyd resin is on the order of 27–35, but we have succeeded in preparing resins of this class having acid numbers of the order of 3–10 by employing a polyhydric alcohol such as glycerin or ethylene glycol in amounts in excess of those theoretically necessary. Emulsions prepared from such resins of low acid number by the above-described procedure have improved stability and can be mixed cold with cold water and applied to the fabrics without heating.

Any of the methods now in use in textile finishing may be employed in applying our new emulsions to textile fabrics. The emulsion is preferably prepared and sold as a thick, milky white liquid having a solids content of 30–60% and a consistency similar to that of heavy cream. This emulsion may then be diluted in the textile mill simply by adding cold, warm or hot water in the proper amounts, after which a softener such as sulfonated vegetable oil may be added if desired. No boiling is required as in the case of starch mixes and the cloth is preferably treated in the dry condition.

The cloth may be run through the liquor by the pad and batch method, or by the use of a pad box at the tenter, or by any other suitable mechanical method. The treated cloth is preferably dried at once, although it can be delivered and dried later if necessary. The drying can be done on cans, on frames or in drying boxes, and at the usual speeds and temperatures. Temperatures running from 240–280° F. at speeds of 60–90 yards per minute in a frame are preferable. After drying, the goods may be calendered and otherwise handled in the usual manner.

The invention will be described in greater detail by the following specific examples. It should be understood, however, that although these examples may illustrate in detail some of the more specific aspects of the invention they are given primarily for purposes of illustration and that the invention in its broader aspects is not limited thereto.

*Example 1*

146 parts by weight of phthalic anhydride, 110 parts of glycerine and 122 parts of benzoic acid were heated to 420° F. and held at this temperature for about 3½ hours, or until a resin having a softening point of 60–61° C. and an acid number of 30 was obtained. This resin was filtered and cooled.

Casein was soaked in water for ½ hour at room temperature and the temperature was then raised with stirring to 45° C. and sufficient ammonium hydroxide was added to form a clear solution. A small amount of sodium pentachlorophenate was then added as a preservative and the final composition was adjusted to contain 15.6% casein and 10.6% NH₄OH.

400 parts by weight of the resin were melted and heated to 90° C. and an equal weight of the casein solution was heated to 60° C. The melted resin was then agitated rapidly with a high-speed stirrer and the casein solution slowly added to make a water-in-oil emulsion. Upon first adding the water phase a thin, clear dispersion was formed which gradually thickened and whitened as the addition continued. Near the end of the casein addition an inversion of the mixture to an oil-in-water emulsion occurred. After all the water phase was added the stirring was continued for about 15 minutes and the emulsion was then further diluted by addition of 55 parts of water. The diluted emulsion was strained and cooled.

The product was a thick, white emulsion containing 57.8% solids. The particle size range of the dispersion was found to be about 1–5 microns with an average particle size of about 2 microns. When applied to dyed piece goods as a finish, this emulsion was found to give the fabric a full, crisp hand. A typical formula found to give excellent results on 80 x 80 4-yd. percales is the following:

| | Gallons |
|---|---|
| Emulsion | 1½ |
| Water to a total of | 100 |

The diluted resin emulsion is preferably heated to 120–130° F. and the cloth run through the solution in a padder. The cloth is then preferably dried at once, on frames or in drying boxes, using temperatures of 240–280° F. With a 39-inch–68 x 72–4.75 percale, 2¾ gallons of the emulsion in 100 gallons bulk is recommended.

*Example 2*

A benzoic acid modified phthalic glyceride resin was prepared as in Example 1, but an excess of 3.5% of glycerine was used. The resulting resin was found to have a softening point of 70–75° C. and an acid number of 3.

A casein solution was prepared as described in Example 1 and added in a thin stream to the molten resin maintained at 90–95° C. After dilution, the product had the following composition:

| | Per cent |
|---|---|
| Oil phase: | |
| Synthetic resin | 43.2 |
| Water phase: | |
| Water | 30.9 |
| Casein | 6.7 |
| NH₄OH (26° Bé.) | 4.6 |
| Sodium pentachlorphenate | 1.0 |
| Dilution water | 13.6 |
| Total | 100.0 |

For finishing white percale sheetings this resin emulsion may be diluted with water to a content of 8 pounds per 100 gallons and applied as described in Example 1. For printed poplin the following formula is recommended:

| | |
|---|---|
| Resin emulsion | gallons 3 |
| Sulfonated vegetable oil 50% | quarts 2 |
| Ammonia | pint 1 |
| Sufficient water to make 100 gallons | |

*Example 3*

A phthalic glyceride resin modified with an alkyl-substituted benzoic acid was prepared by mixing together 146 parts of phthalic anhydride, 110 parts of glycerine and 122 parts of cumic acid (p-isopropyl benzoic acid) and heating the mixture at 200–210° C. for about 3½ hours. The resin had an acid number of 29.1 and a softening point of 67–68° C.

400 parts by weight of the resin were melted and heated to 90° C. and emulsified with an alkaline casein solution, using the procedure described in Example 1. The amount of alkaline casein solution was such that the final emulsion had a 50% solids content.

This emulsion, when diluted with water on the basis of 4 gallons of emulsion to 96 gallons of water was a good finishing agent for cellulose acetate fabrics.

What we claim is:

1. A method of finishing textiles to give a full, crisp hand thereto similar to a starch finish which comprises applying thereto an aqueous emulsion, having a disperse phase consisting of a phthalic anhydride-polyhydric alcohol resin modified by the incorporation therein of a member of the group consisting of benzoic acid and alkyl-substituted benzoic acids and a continuous phase comprising an alkaline casein solution.

2. A method of finishing textiles to give a full, crisp hand thereto similar to a starch finish which comprises applying thereto an aqueous emulsion having a disperse phase consisting of a phthalic glyceride resin modified by the incorporation therein of a member of the group consisting of benzoic acid and alkyl-substituted benzoic acids and a continuous phase comprising an alkaline casein solution.

DONALD W. LIGHT.
ALDEN D. NUTE.